United States Patent

[11] 3,583,373

| [72] | Inventor | Horst Hardenberg<br>Stuttgart-Unterturkheim, Germany |
|---|---|---|
| [21] | Appl. No. | 825,293 |
| [22] | Filed | May 16, 1969 |
| [45] | Patented | June 8, 1971 |
| [73] | Assignee | Daimler-Benz Aktiengesellschaft<br>Stuttgart-Unterturkheim, Germany |
| [32] | Priority | May 17, 1968 |
| [33] | | Germany |
| [31] | | P 17 51 370.1 |

[54] MIXTURE-INDUCING INTERNAL COMBUSTION ENGINE WITH VORTEXING CHARGE IN THE COMBUSTION SPACE
9 Claims, 5 Drawing Figs.

[52] U.S. Cl. ............................................. 123/30C,
123/32, 123/32SP
[51] Int. Cl. ............................................. F02d 35/02
[50] Field of Search ............................................. 123/32, 32
SPA, 30.2, 191 0, 193 P, 75, 75 B

[56] References Cited
UNITED STATES PATENTS

| 2,214,941 | 9/1940 | Taub ............................. | 123/191O |
| 2,718,221 | 9/1955 | Leach ............................ | 123/191O |
| 2,766,738 | 10/1956 | Hoffmann .................... | 123/32 |
| 2,766,739 | 10/1956 | Kosche ......................... | 123/32 |
| 3,318,292 | 5/1967 | Hideg ........................... | 123/32 |

Primary Examiner—Laurence M. Goodridge
Attorney—Craig, Atonelli, Stewart and Hill ABSTRACT: An internal combustion engine with externally applied ignition and suspended valves in which a vortexing movement is imparted to the in-flowing charge and in which a piston combustion space has such a shape that the contact lines of the flame front, as it travels from the area of the ignition source to the circumferential areas of the piston, at least approximates to the contour lines of the recess.

INVENTOR
HORST HARDENBERG

BY
ATTORNEYS

MIXTURE-INDUCING INTERNAL COMBUSTION ENGINE WITH VORTEXING CHARGE IN THE COMBUSTION SPACE

The present invention relates to a mixture-inducing internal combustion engine with external auto- or applied-ignition and suspended valves, in which a swirling or vortexing motion about an axis extending in the cylinder longitudinal direction is imparted to the in-flowing charge flowing into the working cylinder during the suction stroke and in which the ignition source is arranged eccentrically to the cylinder center.

It has been recognized for charge time that an eddying or vortexing flow of the charge in a mixture-inducing internal combustion engine lasts during the entire compression stroke and exerts after the ignition of the mixture a great influence on the velocity of the flame progress. The German Pat. No. 840,780 discloses an internal combustion engine of the aforementioned type, in which the vortexing or eddying movement of the charge is to be used to prevent harmful knocking processes which are caused, as is known, by the self-ignition of mixture components located far from the ignition source which may ignite spontaneously as a result of the combustion pressure of the regularly starting combustion and of the high temperature occuring in connection therewith. The combustion space present during the ignition is located in the prior art internal combustion engine almost completely in the cylinder head and is delimited in the direction toward the working cylinder by the flat piston top of the piston disposed within the area of its compression top dead center position. For the purpose of achieving the required compression ratio, the combustion space has an oval base surface matched approximately to the entire surface of the two valves of the working cylinder which is adjoined by the lateral walls in a direction extending parallel to the cylinder axis. The spark plug is disposed along one flat side of the oval configuration in the lateral walls of the combustion space, whose width is considerably smaller than the interior width of the working cylinder so that during the compression stroke, squeeze or squish surfaces are formed between the cylinder head and the piston top at the side of the spark plug as well as at opposite side of the combustion space. Apart from the fact that the squeeze or squish surfaces impair the desired, rapid circulating movement of the charge in the combustion space, it is additionally disadvantageous that the flame is able to burn into the narrow squeeze gaps only poorly or also too late; namely, at an instant when the piston has already traversed a part of its downward stroke so that this portion of the charge has the possibility to burn either knockingly or to burn belatedly or to escape the combustion altogether.

The present invention therefore aims to avoid the aforementioned shortcoming and to find for the internal combustion engine of the aforementioned type such a combustion space configuration which assures, in addition to the knock-free combustion, also a timely favorable and complete combustion.

The underlying problems are solved in accordance with the present invention in that the combustion space constructed as piston combustion space receiving nearly the entire compression volume has the shape of an essentially flat-walled recess or trough whose greatest depth within the area of the ignition source decreases in the direction of the flame propagation taking place from the ignition source essentially in the movement direction of the charge vortex or eddy up to the outer circumference of the recess in such a manner that the lines of contact of the flame front are simultaneously at least approximately the level or contour lines of the recess.

It is achieved advantageously by the construction of the combustion space in accordance with the present invention that a knock-reducing squeeze or squish surface is present only in that place, i.e., is present only at the place of the combustion space reached last by the flame front, where a knocking might occur. Furthermore, a large portion of the charge is concentrated at the ignition source, whence a rapid burning-through results, particularly since the flame front has the same height along its circumference at each place of its path which is so large at every instant that the flame front is able to seize or encompass as fast as possible the entire combustion space unimpaired by any flame-extinguishing gaps.

According to a preferred construction of the present invention the outer rim of the recess or trough forms at the same time the circumferential rim of the piston top or piston crown whereby with regard to the fixed compression volume, only a relatively flat piston recess and a corresponding slight heat-absorption by the piston results.

With the usual arrangement of the ignition source eccentrically to the cylinder center, customary in particular with internal combustion engines with two valves per cylinder, the last-mentioned combustion space of the present invention requires that the piston becomes differently high along its circumference. Since this may be undesirable in the interest of maintaining an equally high top-land about the entire piston circumference, the outer rim of the recess or trough according to a further feature of the present invention may be disposed at least partially in a common piston cross plant.

Mixture-inducing internal combustion engines with a piston combustion space receiving by far the largest portion of the compression volume are already known as such in the prior art and are described, for example, in the British Pat. No. 971,519. Apart from the fact that no swirling motion of the charge in the combustion space is provided for this internal combustion engine, which is necessary for the avoidance of a knocking danger, the combustion space thereof also involves a conventional combustion space with sidewalls extending parallel to the cylinder axis. However, the great drawback results for this piston combustion space of a considerable heat-absorption by the piston which can be removed from the piston, as known, only with difficulty. The combustion space configuration proposed by the present invention in a mixture-inducing internal combustion engine with a charge vortexing or eddying in the combustion space, however, is neither disclosed nor suggested by this patent.

Accordingly, it is an object of the present invention to provide an internal combustion engine drawing-in a fuel-air mixture and having a swirling charge vortexing within the combustion space which eliminates by simple means the aforementioned shortcomings and drawbacks encountered in the prior art.

Another object of the present invention resides in an internal combustion engine of the type described above, in which the entire charge can be used up in the combustion process without danger of knocking.

A further object of the present invention resides in a combustion space construction for internal combustion engines of the type described above which assures a knock-free as well as a timely favorable and complete combustion.

Still a further object of the present invention resides in an internal combustion engine of the type described above in which a large portion of the charge is concentrated at the ignition source in such a manner that a rapid burning results with a substantially constant height of the flame front at each place along its path.

Still another object of the present invention resides in a mixture-inducing combustion engine of the type described above in which heat absorption by the piston is minimized.

These and further objects, features, and advantages of the present invention will become more obvious from the following description when taken in connection with the accompanying drawing which shows, for purposes of illustration only, several embodiments in accordance with the present invention, and wherein.

Figure 1:
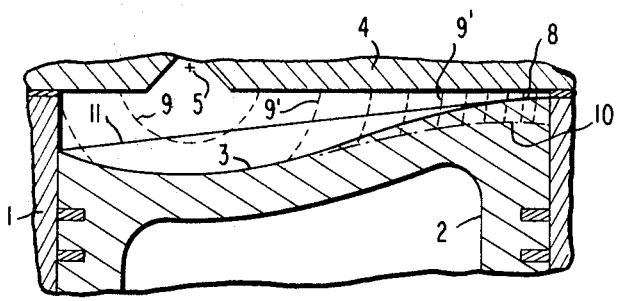
FIG. 1 is a schematic partial longitudinal cross-sectional view through one embodiment of a mixture-inducing internal combustion engine provided with a piston combustion space in accordance with the present invention, taken along line I-I of FIG. 2.

Referring now to the drawing wherein like reference numerals are used throughout the various views to designate like parts, and more particularly to FIG. 1, the internal combustion engine illustrated in this Figure and corresponding to the first embodiment, is provided in its working cylinder 1 with a piston 2 reciprocating in a conventional manner (not shown) and acting on a crankshaft of the internal combustion engine; the crown or top of the piston 2 forms a flat recess 3, i.e., a recess formed by walls with large radii of curvature defining the contours thereof, whose outer rim is simultaneously the circumferential rim of the piston top. In a cylinder head 4 of the internal combustion engine is arranged eccentrically to the cylinder center a schematically indicated ignition source 5 such as a spark plug whose position can be seen from FIG. 2. Furthermore, the internal combustion engine is provided in a customary, known manner (not shown) with one inlet and one outlet valve per working cylinder 1 arranged in the cylinder head 4.

Figure 2:
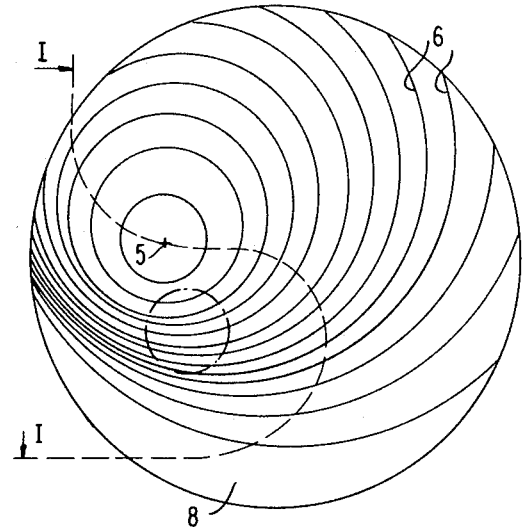
FIG. 2 is a schematic plan view on the piston of the internal combustion engine according to FIG. 1, with contour lines indicating the shape of the piston combustion space.
Figure 3:
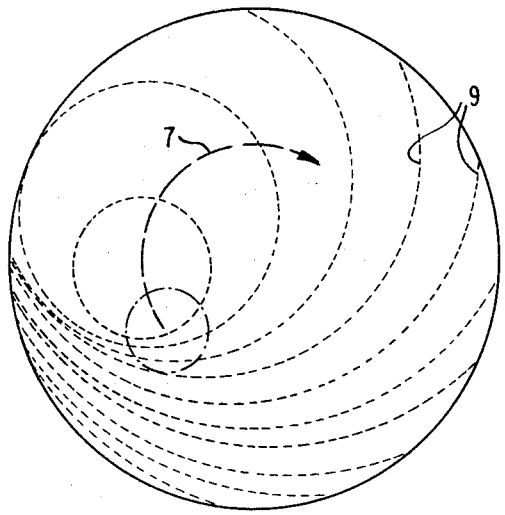
FIG. 3 is a schematic plan view, similar to FIG. 2, with an additionally indicated path of the flame front starting from the ignition source of the internal combustion engine.

Corresponding to the contour or level lines 6 indicated in FIG. 2, the recess 3 has its greatest depth at the place of the spark plug 5 which decreases from the deepest place in the direction of the air swirl or eddy coinciding with the path 7 of the flame front, indicated in dash line in FIG. 3, so that the recess or trough 3 becomes gradually flatter in the direction of the path 7, i.e., has a surface with increasing radii of curvature, and passes over by way of a relatively flat curvature approximately according to FIG. 2 below the spark plug 5 into the rim of the piston top by the formation of a squeeze or squish surface 8. The shape of the recess 3, as to the rest, is so selected that its depth decreases in the direction of the flame propagation taking place from the ignition source 5 essentially in the movement direction of the charge vortex up to the outer circumference of the piston top in such a manner that the lines of contact 9 of the flame front, indicated in dash line in FIG. 3, are the same time at least approximately contour lines of the recess 3.

In FIG. 3, the path 7 of the flame front for a ratio of angular velocity of the charge to the average flame velocity of 1.8 is illustrated whereby under the term "angular velocity of the charge" is understood in this case the velocity of the charge rotating as a block along a circle, whose radius corresponds to the distance of the spark plug 5 from the cylinder axis. After the ignition, the center point of the flame front travels along the path 7 with a constant velocity which corresponds to the angular velocity of the charge in the direction of the vortex. The circularly shaped flame front, indicated in FIG. 1 in dash lines, thereby increases with a simultaneously decreasing velocity whose initial magnitude results from the compression of the noncombusted residual gases until the flame front has encompassed the entire combustion space. The theoretical knocking place disposed approximately diametrically opposite the eccentric ignition source in engines without rotation or vortexing of the charge, is displaced by the swirl or vortex in the direction of rotation of the charge and is now located approximately at the place of the squeeze surface 8 is. It should be noted, however, that the area of the squeeze surface 8 is reached by the flame front 9' only at an instant when the piston 2 has already begun its work-stroke. In FIG. 1, the dashed lines located in the direction toward the squeeze surface 8 and illustrating the progress of the flame front 9' are therefore extended downwardly so far as corresponds to the piston position during the already begun work-stroke of the piston 2. The connecting line 10, illustrated as dash and dot line, of the lower ends of these lines illustrates, how far the piston 2 has already moved out of its top dead center position when the flame front 9' has reached the area of the squeeze surface 8. The combustion space is already so high at this place farthest removed from the spark plug in the combustion direction; namely, at the theoretical knocking place, that the flame front 9' is able to seize unimpairedly and instantly this entire area.

Figure 4:
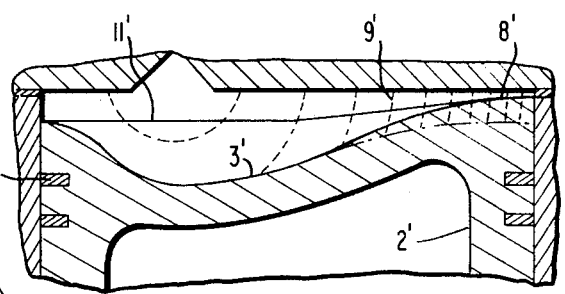
FIG. 4 is a schematic partial longitudinal cross-sectional view, similar to FIG. 1, through a modified embodiment of an internal combustion engine in accordance with the present invention.
Figure 5:
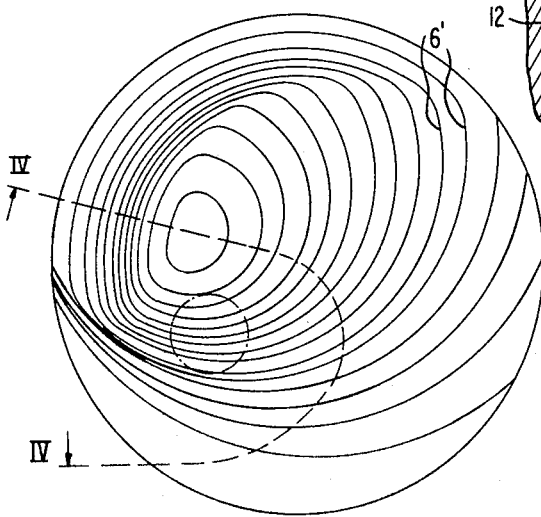
FIG. 5 is a plan view, similar to FIG. 2, on the piston of the internal combustion engine according to FIG. 4.

The configuration of the recess 3 corresponding to the first embodiment necessitates that the tim 11 of the recess 3 forming at the same time the rim of the piston top is no longer located on a cross plane perpendicular to the piston axis. The differing height of the top land connected therewith along the piston circumference may make it desirable to so change the recess or trough space in the manner illustrated in FIGS. 4 and 5 that the outer rim 11' of the recess 3' is located to a large extent in a common piston cross plane. A top land remaining of the same height over a large part of the piston circumference results therefrom. One is therefore able to arrange the first piston ring 12 higher than with a piston 2 according to the first embodiment whereby the ratio of combustion space surface to combustion space volume is improved, i.e., can be reduced. FIG. 5 with a plan view on the piston top provided with the recess 3' and the contour lines 6' illustrates in conjunction with the dashed lines of the flame front 9' in FIG. 4 how a combustion process, similar in principle as in the first embodiment, is achieved nonetheless in which the flame front 9' is also able to burn unimpaired into the space above the squeeze surface 8' because also in the second embodiment, the piston 2' has already left its top dead center position when such burning of the flame front into the space above the squeeze surface 8' takes place.

The term "flat" in connection with the wall portions defining the recess 3 refers to wall portions having at least relatively large radii of curvature.

While I have shown and described only two embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are within the scope of those skilled in the art.

I claim:

1. A mixture-inducing internal combustion engine with externally applied ignition and suspended valves, which includes means for imparting to the charge flowing into the working cylinder during the suction stroke a swirling movement about an axis extending generally in the direction of the cylinder axis and an ignition source arranged eccentrically to the cylinder center, and in which the piston top is provided with a substantially flat-walled recess, characterized in that the recess forms a piston combustion space receiving nearly the entire compression volume in the piston top dead center position, and in that the depth of the recess decreases in the direction of the flame propagation, taking place from the ignition source in the direction of movement of the charge swirl, up to the outer circumference of the recess in such a manner that the lines of contact of the flame front are at least approximately contour lines of the recess.

2. An internal combustion engine according to claim 1, characterized in that the relatively flat wall portions of the recess have relatively large radii of curvature.

3. An internal combustion engine according to claim 2 characterized in that said wall portion define at least those areas of the recess traversed by the flame front in its travel from the ignition source toward the outer circumference in the direction of the charge swirl.

4. An internal combustion engine according to claim 1, characterized in that the greatest depth of said recess is located within the area underneath the ignition source.--

5. An internal combustion engine according to Claim 3, characterized in that the combustion space formed by said recess is irregularly curved and asymmetrical to the cylinder axis, with the wall portions thereof from the area underneath the ignition source to the nearest circumference of the recess having generally smaller radii of curvatures than the wall portion of the recess from said area to the diametrically opposite circumference of the recess.

6. An internal combustion engine according to claim 1, characterized in that the combustion space formed by said recess is irregularly curved and asymmetrical to the cylinder axis, with the wall portions thereof from the area underneath the ignition source to the nearest circumference of the recess having generally smaller radii of curvatures than the wall portion of the recess having generally smaller radii of curvatures than the wall portions of the recess from said area to the diametrically opposite circumference of the recess.

7. An internal combustion engine according to claim 1, characterized in that the outer rim of the recess forms simultaneously the circumferential rim of the piston top.

8. An internal combustion engine according to claim 7, characterized in that the outer rim of the recess is disposed at least partially in a common piston cross plane.

9. An internal combustion engine according to claim 1, characterized in that the outer rim of the recess is disposed at least partially in a common piston cross plane.